United States Patent
Seefeldt et al.

[19]

[11] Patent Number: 6,074,246

[45] Date of Patent: Jun. 13, 2000

[54] METER EXTENDER MOUNT FOR GENERATOR INTERFACE

[75] Inventors: William J. Seefeldt, Monticello, Minn.; Larry R. Blackwell, Yucaipa, Calif.

[73] Assignee: Electro Industries Inc, Monticello, Minn.

[21] Appl. No.: 09/300,054

[22] Filed: Apr. 27, 1999

[51] Int. Cl.[7] .......................... H01R 13/44; H01R 33/945
[52] U.S. Cl. .......................... 439/517; 439/146; 439/167; 220/664; 361/668
[58] Field of Search .................................... 439/146, 167, 439/517; 220/664; 361/659–672

[56] References Cited

U.S. PATENT DOCUMENTS

| | | | |
|---|---|---|---|
| 2,738,672 | 3/1956 | Smith et al. | 220/664 X |
| 4,521,692 | 6/1985 | Genuit . | |
| 5,088,004 | 2/1992 | Howell | 361/668 X |
| 5,191,229 | 3/1993 | Davis . | |
| 5,216,802 | 6/1993 | Cole et al. | 439/517 X |
| 5,268,850 | 12/1993 | Skoglund . | |
| 5,309,031 | 5/1994 | Stewart . | |
| 5,621,254 | 4/1997 | Takeda . | |
| 5,633,539 | 5/1997 | Tassitino . | |
| 5,672,823 | 9/1997 | Lachmann | 361/659 X |

*Primary Examiner*—Stanley J. Witkowski

[57] ABSTRACT

A meter extender mount unit which is positioned between the ordinarily supplied electrical meter and the utility, meter mounting socket. The extender mount provides a male, push-in connection to the existing utility socket mount and the meter is received into female connectors on the opposite side thereof with a capture ring positively locking the meter to the extender mount. The frontal closure panel of the utility socket is designed to captured the extender without requiring a capture ring. A quick connect is provided directly on the extender mount for delivery of power to the meter socket from a remote. A control unit is provided between the generator and utility socket which insure activation of the generator following loss of power from the utility, insures generator shut off upon restoration of utility company power to prevent feedback of power to the utility line and allows or periodic testing of the generator to insure its operability.

6 Claims, 6 Drawing Sheets

METER EXTENDER MOUNT FOR GENERATOR INTERFACE

SPONSORSHIP

The invention has not bee made under any Federal or Independent sponsorship and is the sole result of the efforts of the Applications.

RELATED APPLICATIONS

Applicants have not filed any previous application related to the subject matter of this application and are not aware of any applications by others that may be on file that would relate to the subject matter of this applications.

FIELD OF THE INVENTION

This invention relates generally to the connection of auxiliary power sources to residential or commercial locations and more specifically to a meter extender mount which allows the interconnect of a standby generator at the location of the utility meter without requiring electrical connections into the electrical panel of the location and which provides a ringless connection between the utility meter socket and the extender mount.

SHORT SUMMARY OF THE INVENTION

A meter extender mount to allow for the connection of a standby generator at the location of the utility meter without requiring connections through and into the control panel of the site. Basically the extender includes male and female connectors on opposite ends of the mount with the male connectors being receivable into the female connectors of the utility meter socket with is provided at the site which are, in turn, connected to the control panel of the residence or business for delivery of power thereto with the female connectors of the mount receiving the utility meter male elements. The depth of the extender allows a direct connection to a standby generator through an intermediate control panel. The generator is utilized to provide power to the site following utility power delivery interruption for a predetermined period and which is turned off after power service has been restore. The immediate generation control panel includes means for preventing power delivery back to the utility power line and permits periodic testing of the generator. The connection of the extender mount to the socket site socket is ringless.

This arrangement provides for remotely locating a generator to eliminate noises and fuel smells to the site.

BACKGROUND AND OBJECTS OF THE INVENTION

In the past, when power outages occurred, many residences, businesses and the like have relied upon standby generators to provide required power. Most such installations placed the generator in close proximity to the power distribution panel of the site which was often indoors and this location often caused noise and exhaust annoyances. In addition to these annoyances, it was necessary to connect the generator through the power panel of the site which complicated the installation.

With the Applicants' invention, the generator may be connected at, or close to, the location of the utility meter. The utility meter along with the meter socket cover or closure panel is removed, the extender mount positioned into the site socket, the closure panel replaced and the meter replaced. No lock ring is necessary between the site socket and the extender. A minimum number of connections are required for operation of the generator and power delivery to the site and all required connections take place at the meter socket location.

It is therefore an object of the Applicants' invention to provide a utility meter extender mount which is directly connected into the utility meter socket with the meter being replaced into the extender thereafter.

It is a further object of the Applicants' invention to provide a utility meter extender mount which allows the connection of a standby generator thereto to receive power therefrom and direct the same for use to the site.

It is a further object of the Applicants' invention to provide a utility meter extender mount which provides for direct connection of the site to a standby generator and where power received from the generator is prevented from being delivered to the utility power lines and is directed only for usage to required locations at or in the site.

It is still a further object of the Applicants' invention to provide a meter extender mount which is secured to the site socket through the frontal panel of the socket housing to eliminate any connection or locking ring therebetween.

These and other objects and advantages of the Applicants' invention will more fully appear from a consideration of the accompanying drawings and description of a preferred form of the invention.

SHORT DESCRIPTION OF THE DRAWINGS

DISCLOSURE OF A PREFERRED FORM OF THE INVENTION

Figure 1:
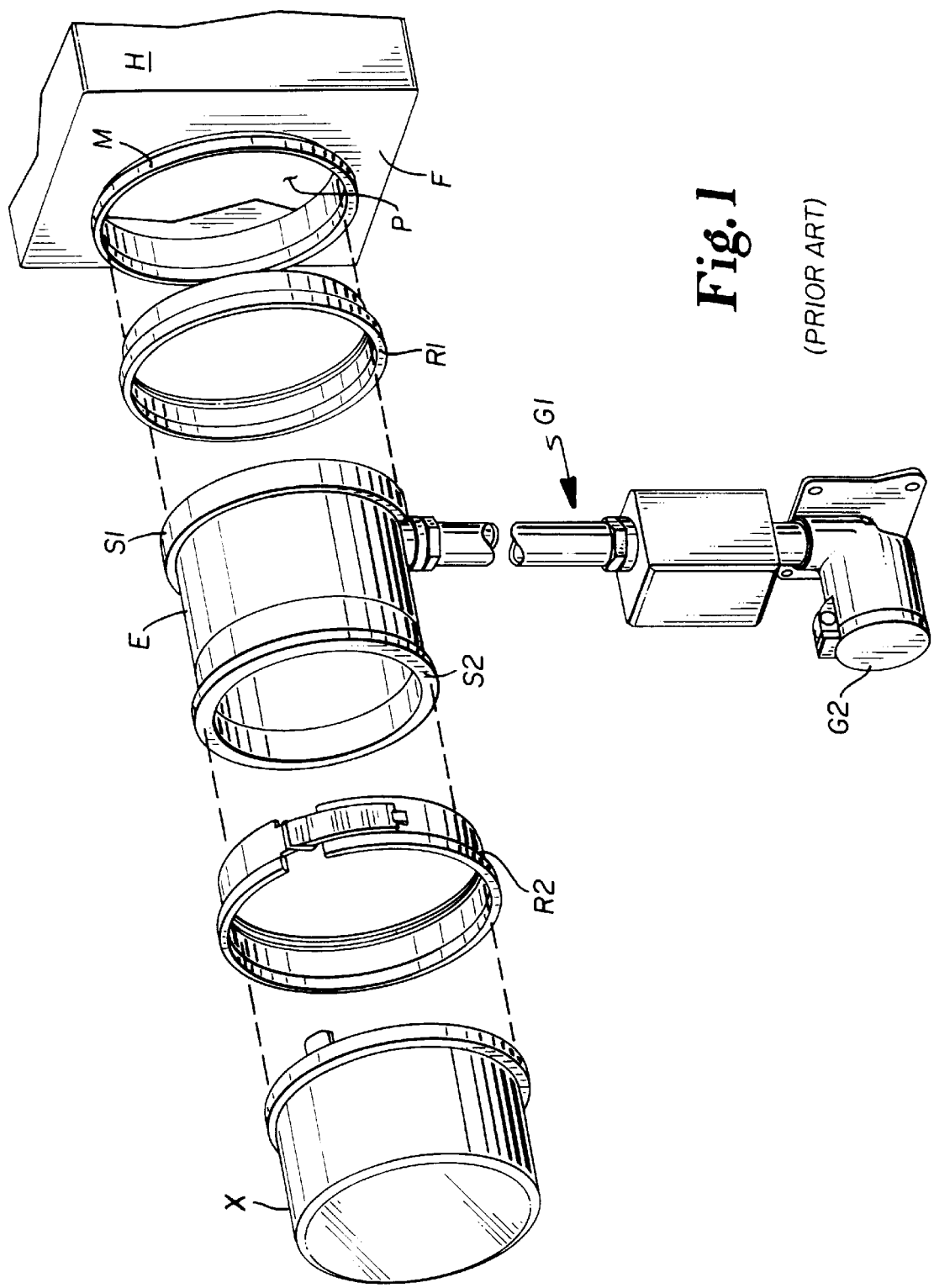
FIG. 1 is an exploded view of a t6ypical, prior art arrangement for the extended mounting of an electrical utility meter with a rigid connection to a remote power sources through the extender.

In accordance with the accompanying drawings, a typical prior art arrangement for the extended mounting of a utility meter to a site which affords connection to a remote power source is illustrated in FIG. 1. Certain of the indicia to designate the various portions of the prior art arrangement are utilized in connection with the description of the Applicants' invention.

As illustrated in FIG. 1 a site housing H is provided having a removable front panel F which panel F is provided with a passage P therethrough circumscribed by a mounting flange M. The passage P allows an extender E to be positioned therein and be received and connected into the meter socket of the site. The extender E is provided with a first and second shoulder S1, S2 and a first attachment ring R1 will encircle flange M of front panel F and the first shoulder S1 of the extender E to secure the extender E to the site socket. The utility meter X is received against the shoulder S2 of the extender E and a second ring R2 secured the meter X to the extender E. As also illustrated in FIG. 1, a typical, prior art power supply, rigid and fixed, connector G1 is provided through the body of the extender E and terminates in a plug-in connector G2 to receive power from a remote generator or the like.

As illustrated in this prior art view, it is necessary to secure the extender E to the site socket housing H and the meter X with attachment rings R1, R2. Applicants' invention eliminates the requirement of ring R1 and utilizes a holding tab configuration in combination with the meter passage of the front panel to hole the extender in proper position and further utilizes a quick connect for connection of the remote power source to the extender and thus the site.

Figure 2:
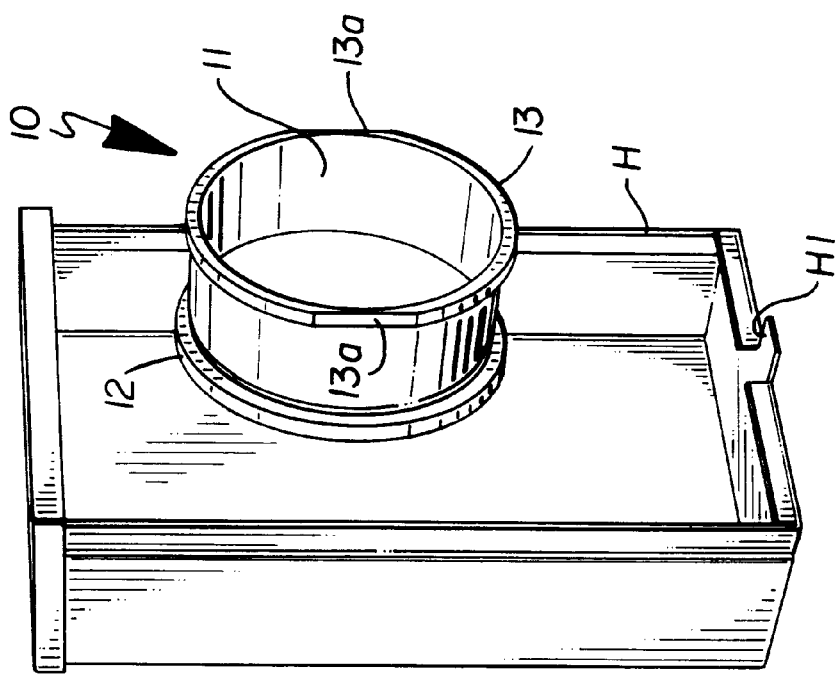
FIG. 2 is a perspective view of a socket housing and extender illustrated in the position it would take with respect to the housing.

The Applicants' invention, beginning with FIG. 2 and continuing sequentially thereafter illustrate a site housing and the structure for positioning the extender with respect thereto into a manner to eliminate the connector ring R1.

Throughout the illustrations of the Applicants' invention, the female meter socket at the site housing is not illustrated and only the male and female lug and socket at the opposite ends of the extender are shown.

As illustrated in FIG. 2, extender 10, conforming to the invention, includes a longitudinally extending body 11 having radially extending shoulders 12, 13 at the respective ends thereof and is shown in such Figure at its proper location with respect to the site housing H. As illustrated in this Figure, housing H has a capturing element H1 to pass through passage P2 of panel P and allow for locking of the panel P to the housing H.

Figure 3:
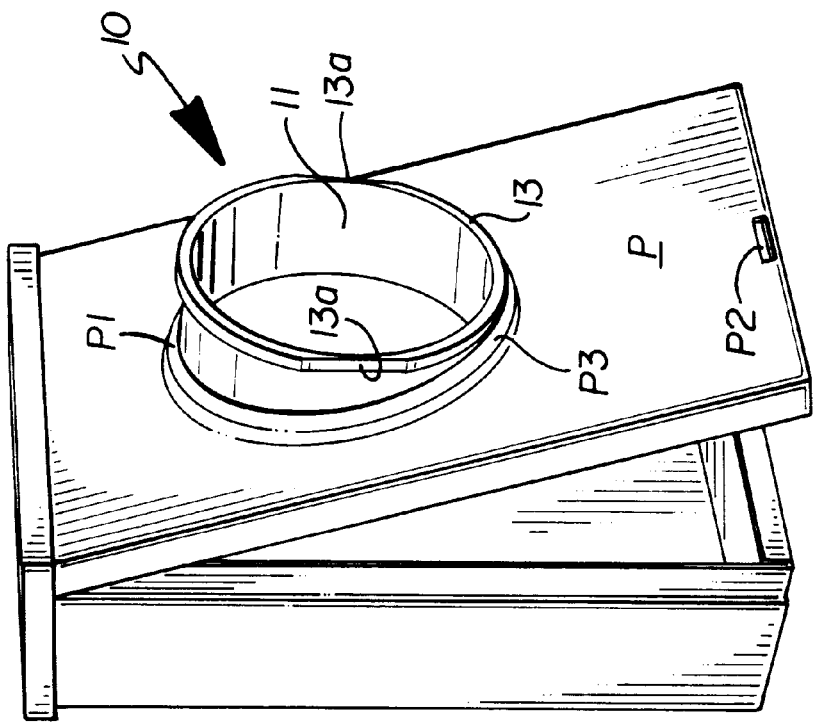
FIG. 3 is a perspective view similar to FIG. 2 illustrating the placement of the front panel of the housing to the extender.

FIG. 3 illustrates the positioning of the front panel P to allow the extender E to be positioned within passage P1 and the structure of this passage P1 will be discussed hereinafter.

Figure 4:
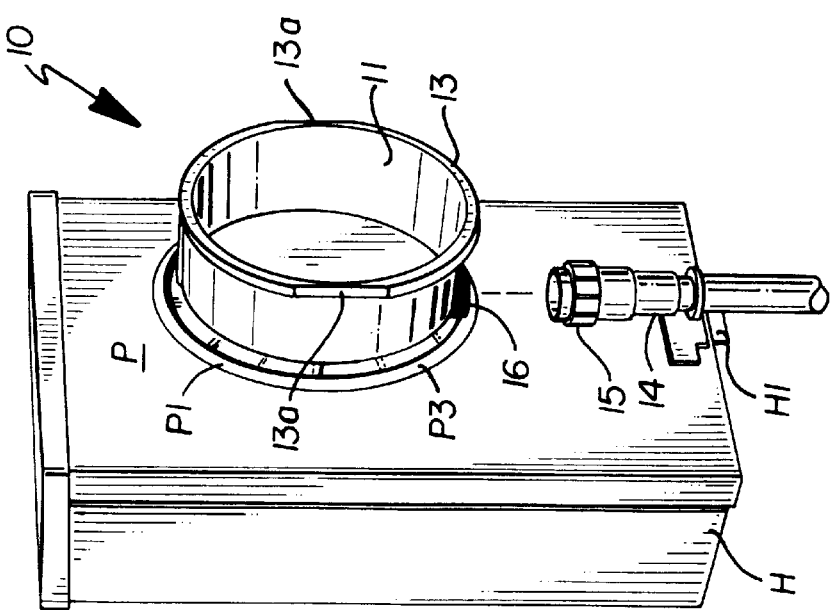
FIG. 4 is a continuing perspective view illustrating the closure of the front panel to secure the extender to the housing and illustrating the accommodating connector to the remote generator.

FIG. 4 illustrates the panel P in closed position against housing H with the closure latch H1 extending through panel P, in position to receive a locking means. In this position, the extender 10 is secured to the housing H without the requirement of a ring relying only on the formation of passage P1 as illustrated in FIGS. 7a, 7b. As also illustrated in FIG. 4 a generator connector 14 is provided having a quick connect end 15 joinable to a connector member 16 provided through and into the extender body 11.

Figure 8:
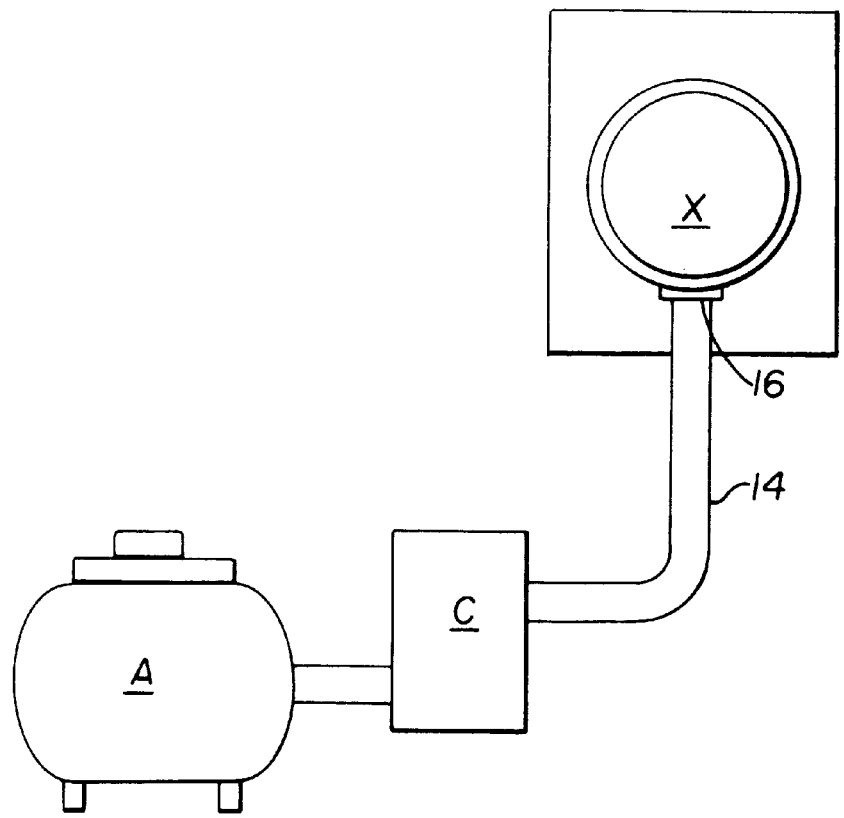

The block diagram of FIG. 8 illustrates an entire structure of meter X arrangement, generator A and generator control panel C to eliminate the generator plug-in G1, G2 of the prior art.

As illustrated in FIG. 2, extender 10, conforming to the invention, includes a longitudinally extending body 11 having radially extending shoulders 12, 13 at the respective ends thereof and is shown in such Figure at its proper location with respect to the site housing H. As illustrated in this Figure, housing H has a capturing element H1 to pass through passage P2 of panel P and allow for locking of the panel P to the housing H.

FIG. 3 illustrates the positioning of the front panel P to allow the extender E to be positioned within passage P1 and the structure of this passage P1 will be discussed hereinafter.

FIG. 4 illustrates the panel P in closed position against housing H with the closure latch H1 extending through panel P, in position to receive a locking means. In this position, the extender 10 is secured to the housing H without the requirement of a ring relying only on the formation of passage P1 as illustrated in FIGS. 7a, 7b. As also illustrated in FIG. 4 a generator connector 14 is provided having a quick connect end 15 joinable to a connector member 16 provided through and into the extender body 11.

The block diagram of FIG. 8 illustrates an entire structure of meter X arrangement, generator A and generator control panel C to eliminate the generator plug-in G1, G2 of the prior art.

Figure 6:
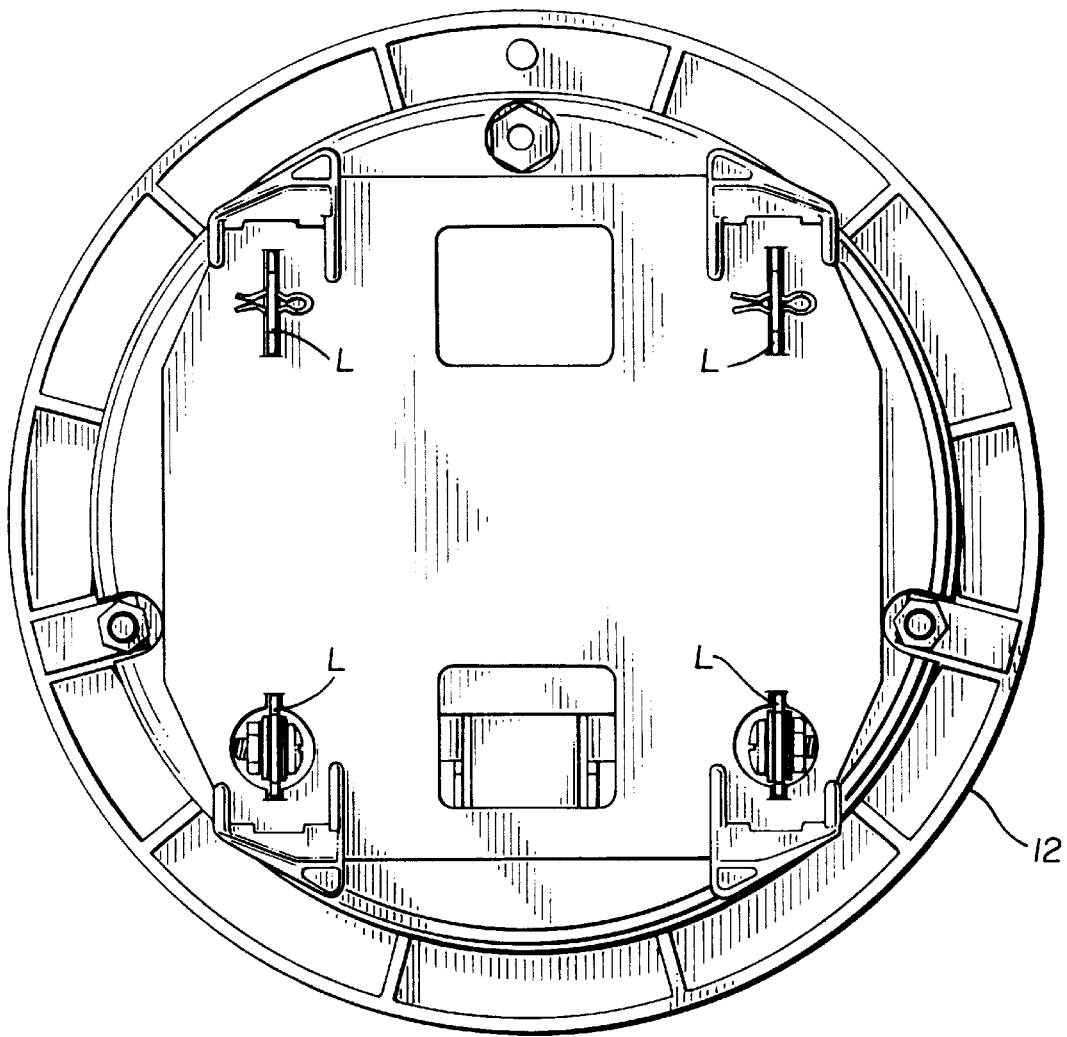
FIG. 6 is an end view of the extender illustrating the male lug attachments that will be placed into the utility meter socket.
Figure 7:
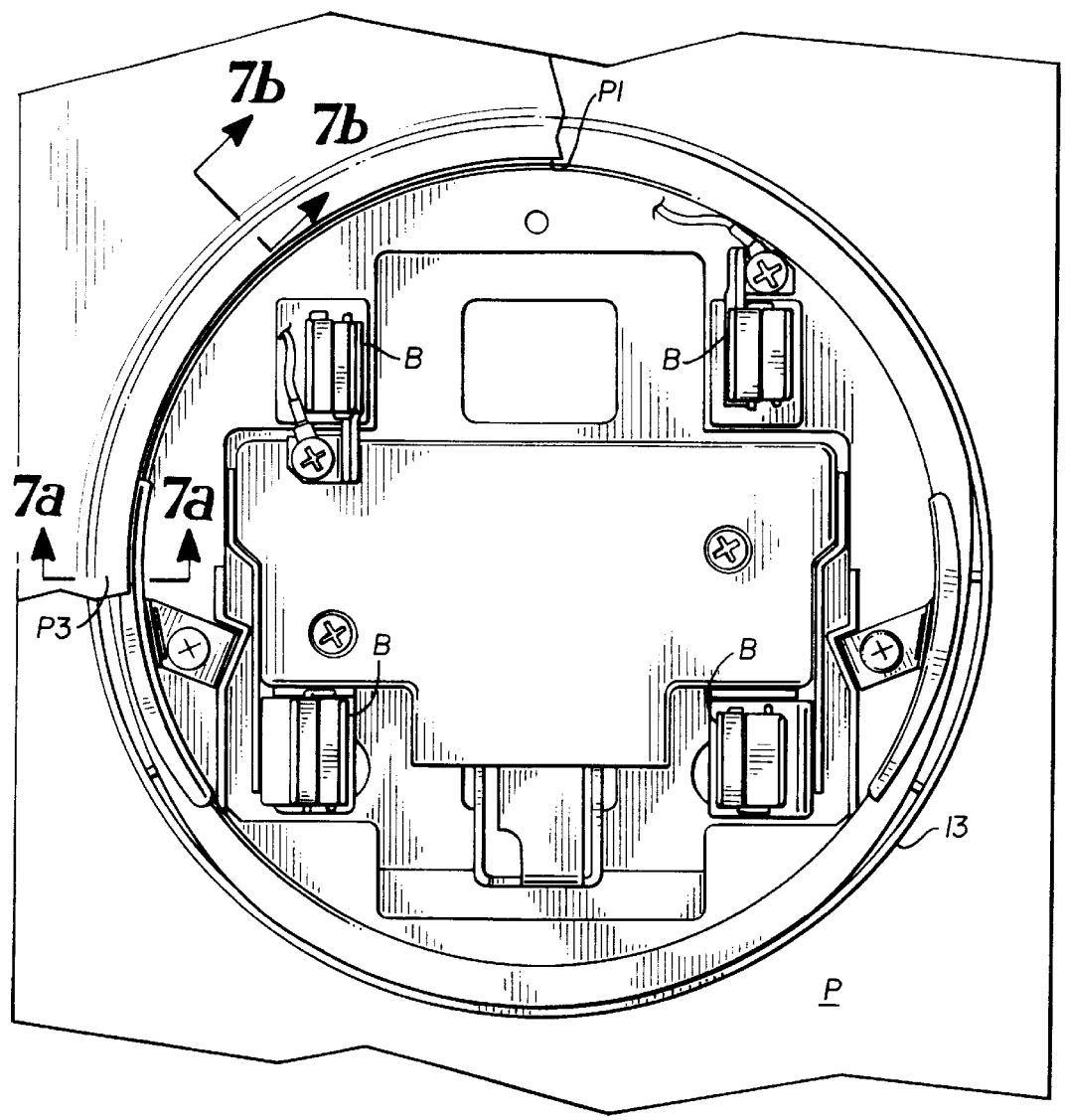
FIG. 7 is a an end view of the, opposite that of FIG. 6, illustrating the female elements into which the meter male elements will be inserted.
Figure 7A:
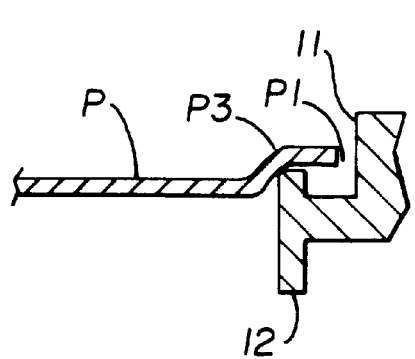
FIG 7a is a section taken substantially along Line 7a—7a of FIG. 7 illustrating the capturing tabs of the housing front panel passage which secure the extender to the site socket.
Figure 7B:
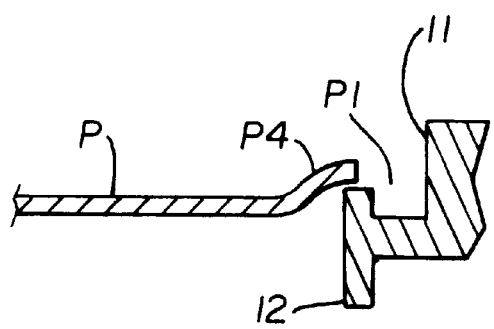
FIG. 7b is a section taken substantially along Line 7b—7b of FIG. 7 illustrating the remaining portion of the passage formed through the housing front panel which passes over the extender; and, FIG. 8 is a block diagram illustrating a typical installation of a remote generator to supply power to a site.

The structure for retaining the extender by the configuration of passage P1 through the frontal panel P is illustrated in FIGS. 6 and 7. As illustrated therein, the major circumference of passage P1 is defined as an upwardly curved lip P4 providing a dimension which will allow the extender shoulder 13 to pass therethrough and having at least a pair of tabs P3 bent downwardly therefrom to abut with extender shoulder 12. This tab structure then positively holds the extender until 10 engaged position with the housing female socket contained within housing H. With these retaining tabs P3, it is not necessary to secure the extender to the front panel with the ring R1 and the curved lip 12 insures that water will not enter into the housing and affect the connection between the extender structure and the utility housing socket.

The interior of the extender is provided with male lugs L on one end thereof and female receptacles B on the other end thereof. The lugs L, are obviously, receivable into the utility socket within housing H and the corresponding male lugs of the meter X and receivable into the female receptacles of the extender 10.

Figure 5:
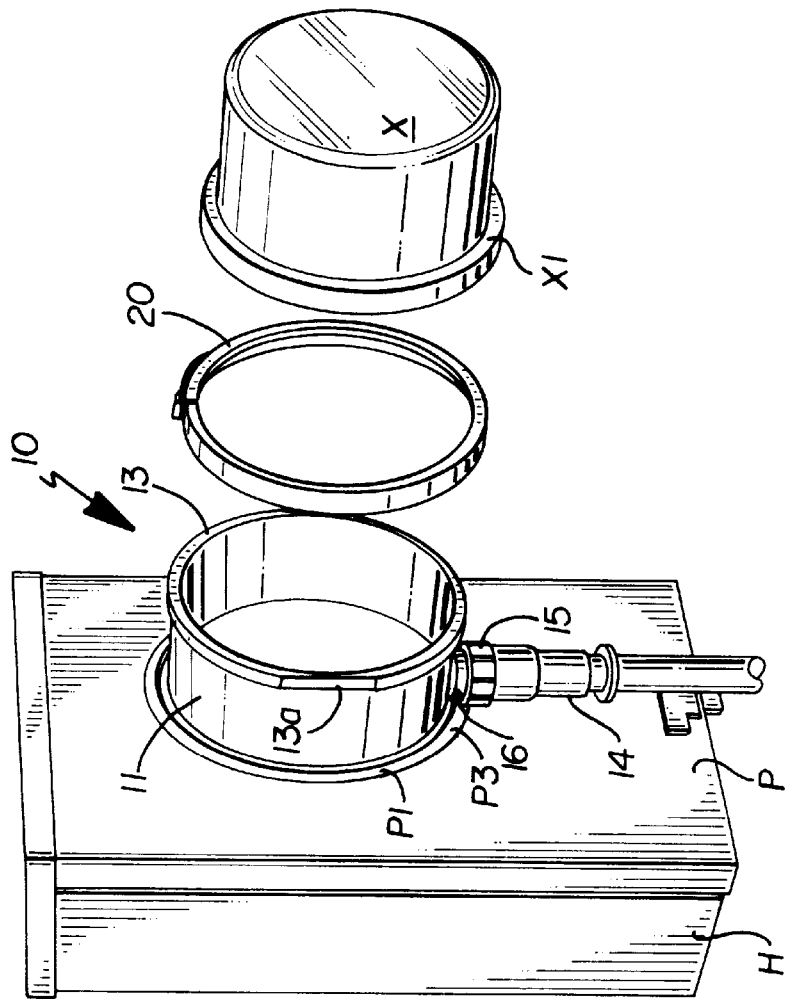
FIG. 5 is a continuing perspective view illustrating the attachment ring and utility meter as they would be positioned to the extender and illustrating the connection to the remote generator being attached to the extender.

As further illustrated in FIGS. 4 and 5, the shoulder 13 of extender 10 is selectively relieved as at 13a to allow passage of the extender through the front panel P with shoulder 12 abutting with tabs P3. Although the applications have chosen a pair of securing tabs, it should be obvious that this number is a matter of choice and the relief areas will correspond to the selected numner of such tabs.

With the extender now being held by the front panel P of housing H, the meter X is attached to shoulder 13 thereof through a connector ring 20 circumscribing shoulder 13 and a shoulder X1 of the meter X. All of the rings mentioned R1, R2 and 20 are split and include connectors and locking elements for securing the same and recited elements.

The block diagram of FIG. 8 illustrates a typical generator connection and with applicants' unit, the control panel C includes control for staring the generator A upon cessation of power supply from the utility company after a predetermined period, prevention of power transmission from the generator A back through the power lines, stopping of the generator upon restoration of power from the utility company and periodic operation of the generator A as a check of its operational condition from time to time.

As stated, a primary consideration of the Applicants' invention is to provide for the connection of the extender to the site socket housing with the elimination of a connector ring while effectively holding the extender and its included power transmission elements into such socket and receiving the utility meter thereon.

What is claimed is:

1. A utility meter mounting unit and elements cooperative therewith for placement of a utility meter a predetermined distance from the normally available meter power socket and meter power socket housing which provides a power connection site, including:

a) a front panel arrange for attachment to said meter power socket housing for closure of the same;

b) said front panel having a passage therethrough to allow said mounting unit to be attached to the meter socket and extend through said panel;

c) said meter mounting unit including a longitudinally extending body having a pair of ends, a first of said ends being of a dimension to pass through said panel passage, the other of said end providing a radially outwardly extending shoulder of great dimension than said body;

d) connection means provided integrally with said body to be received into the power socket for power transmission connection of said body to the socket;

e) at least one capturing means integral with said panel passage to abut with said extending shoulder of said other end of said body whereby said body is maintained by said panel in connected position in the power socket;

f) means for securing said panel to the housing to maintain said body in connected position to the power socket;

g) said extending body providing a connector passage therethrough between the shoulders thereof for receiving power from a remote power source for delivery of the same to the site; and, h) means for securing a meter at first end of said body.

2. The utility meter mounting until as set forth in claim 1 and at least a pair of capturing means integral with said panel passage, said extending shoulder of said other end of said body including a coinciding number of relief areas thereon.

3. A utility meter mounting unit and elements cooperative therewith for placement of a utility meter a predetermined distance from the normally available meter power socket and meter power socket housing which provide a power connection site, including:

a) a longitudinally extending body member having a pair of ends;

b) electrical transmission means within said body providing male lugs at one end thereof and female receptacles on the other end thereof whereby said body may be positioned within the meter power socket to receive power therefrom and receive a utility meter on the other end thereof;

c) the housing including means for securing said body thereto in electrical transmission position to the site; and, d) means for delivering power to said electrical transmission means from a remote source.

4. The utility meter mounting unit as set forth in claim 3 said means for delivering power to said electrical transmission means from a remote source including quick connect means extending through said body.

5. The utility meter mounting unit as set forth in claim 4 and said quick connect means including:

a) a male element arranged to extend through said body; and, b) a female element arranged and constructed for connection to said male element.

6. The utility meter mounting unit as set forth in claim 5 and said quick connect means includes:

a) said male element is provided with internal female connection means, and, b) said female element is provided with internal male connection means for engagement with said females connection means of said male element.

* * * * *